(12) United States Patent
Hardy

(10) Patent No.: US 6,702,078 B2
(45) Date of Patent: Mar. 9, 2004

(54) FLOOR CABLE MANAGEMENT SYSTEM

(76) Inventor: Thomas Ray Hardy, 310 Tellico Rd., Canton, GA (US) 30115

( * ) Notice: Subject to any disclaimer, the term of this patent is extended or adjusted under 35 U.S.C. 154(b) by 158 days.

(21) Appl. No.: 10/036,190

(22) Filed: Jan. 3, 2002

(65) Prior Publication Data

US 2003/0121742 A1 Jul. 3, 2003

(51) Int. Cl.[7] .............................................. H02G 11/02
(52) U.S. Cl. ................................................... 191/12.4
(58) Field of Search ......................... 191/12 R, 12.2 R, 191/12.4; 174/48

(56) References Cited

U.S. PATENT DOCUMENTS 4,054,222 A * 10/1977 Suk ............................ 220/3.8
6,450,353 B1 * 9/2002 Riedy et al. ................. 220/3.3

* cited by examiner

Primary Examiner—S. Joseph Morano
Assistant Examiner—Robert J. McCarry, Jr.

(57) ABSTRACT

A floor cable management system, which may simulate an in floor diffuser unit, that includes a below floor electrical receptacle having a top circular opening, and an above floor level circular housing for removably mounting to and over the circular opening. The above floor level circular housing includes a hinged cover member, which in turn mounts plural hinged access doors to allow feeding selected wires, cables and power cords to the below floor electrical receptacle, where the access doors may be locked to protect the fed items against damage.

8 Claims, 5 Drawing Sheets

FLOOR CABLE MANAGEMENT SYSTEM

FIELD OF THE INVENTION

This invention is directed to the field of managing wire, cable and power cords to a plurality of equipment, such as phones, computers and related accessories, where such equipment must be connected to under floor communication links.

BACKGROUND OF THE INVENTION

The present invention relates to a system for accessing and protecting wires, cable and power cords in communication with an under floor, or raised floor, electrical and communication link, such as found in modern day office complexes.

Most large office buildings constructed in the past ten years consist of individual offices, preferably along all of the building facade surrounding a large open interior office space. Interior offices are created using acoustical partitions and modular furniture, which may be easily relocated to reconfigure the office space in accordance with occupancy or process demands. The prominent detriment to reconfiguration is usually the relocation of electrical and mechanical services. Electrical services include power and communication transmission cables and their receptacles, while mechanical systems refer primarily to the air conditioning and ventilation systems.

Several construction methods have been developed to allow relocation of electrical services in the open office environment. All of these systems, as known in the art, depend on placement of the outlets within the floor plane.

The use of raised access floors in office space applications is rapidly gaining popularity. These systems allow power and communications wiring to be located in an easily accessible cavity below the office floor. In addition, the cavity may be used for the supply of conditioned air to the office space, eliminating most of the ductwork and insulation requirements that are inherent to overhead systems.

Underfloor air delivery systems are now becoming popular with the business community and developers due primarily to economics. Underfloor air systems, as presently known, deliver air to large zoning plenums via air terminals mounted in a floor cavity. Air is delivered to the occupants, such as employees, by means of high induction floor outlets that are tapped directly into the pressurized floor plenum. Additionally, such air systems allow for easy reconfiguration and add ons for the office communications, however, problems can persist in the connection of equipment. Upstanding floor receptacles are not practical, and floor holes can result in damage to the wires, cables, and power cords.

The prior art means for providing access for equipment to the under floor communication links and power do not provide the protection against damage that can be critical to an effective operation. If a computer inadvertently loses power, important data may become lost. This can happen when a worker's foot accidentally kicks a power outlet causing damage to the power cord or disconnecting same, for example. The manner by which the present invention provides protection to a series of cables, wires and power cords for communication equipment connected to an under floor communication link will become apparent in the description which follows, especially when read in conjunction with the accompanying drawings.

SUMMARY OF THE INVENTION

This invention is directed to the combination of a below floor level cable power and communication link, and a floor cable management system to provide protection to electrical and data communication cable connections between selected communication equipment and the below floor cable power and communication link. The selected communication equipment mounts a cable for connection to a source of electricity or data transmission. The system comprises a below floor electrical receptacle, mounted to an under floor plenun, for example, and includes a top with a circular opening. The below floor electrical receptacle mounts various connection means for electrical power cords, co-axial cable connections, and/or phone connections, as known in the art. Cooperating with the below floor electrical receptacle is an above floor level circular housing for removably mounting within the circular opening, such as by a pin and slot arrangement. The above floor level circular housing consists of a continuous annular wall terminating at first edge in an annular flange for lying contiguous with the floor. Additionally, the above floor circular housing includes a hinged cover member planarly aligned with the annular flange for gaining initial access to the various connections mounted therein. The cover member includes a central concentric section, where the cover member further includes a plurality of segmented access doors movable, i.e. hinged, and lockable relative to the central concentric section.

Accordingly, an object of this invention is to provide a convenient protective mechanism for electrical and data transmission cable connected to below floor receptacles.

Another object of the invention hereof is the provision of circular housing having a hinged cover member for initially accessing the variety of receptacles, where the hinged cover further includes plural hinged sections that may be locked to protect wires and cable passing therethrough.

A further object of the invention is a central section of the cover member that includes a floating handle or lift button for lifting and latching the cover member to the supporting housing member.

These and other objects of the invention will become apparent in the specification which follows, particularly when read by one skilled in the art.

DETAILED DESCRIPTION OF THE PREFERRED EMBODIMENT

Figure 1:
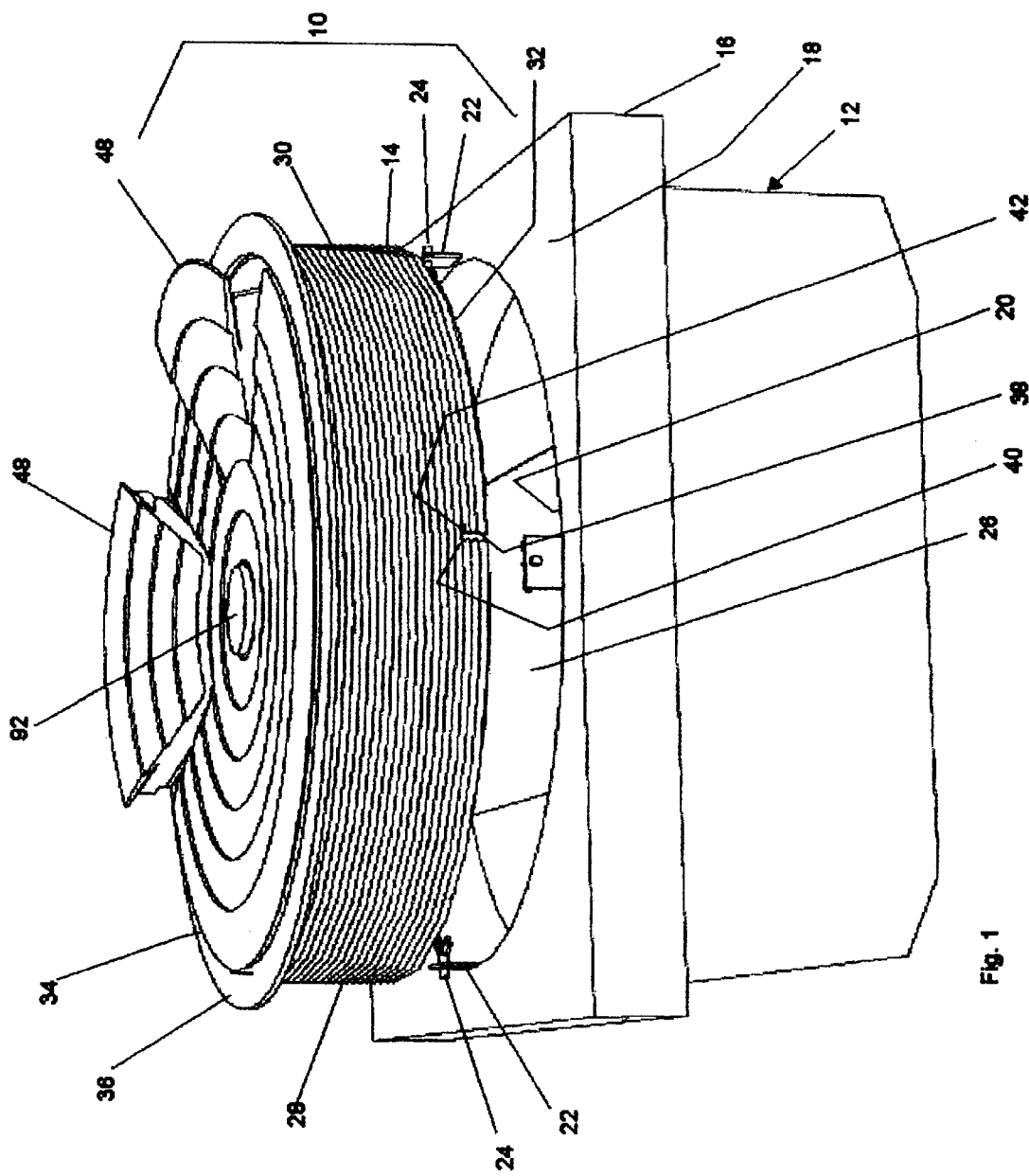
FIG. 1 is an exploded perspective view of the floor cable management system of this invention, showing an electrical receptacle housing for receiving a circular above floor housing, where the above floor housing show plural cables and wires extending through the cover member.

The present invention relates to a floor cable management system to protect wires, cables and power cords extending form a variety of data and communication equipment connected to the power and communication cable in an under or raised floor office complex. The invention will now be described with regard to the several Figures where like reference numerals represent like components or features throughout the several views.

Turning first to FIG. 1, illustrating the system of 10 this invention an exploded fashion, the system comprises an under or raised floor electrical receptacle 12 for mounting to the air distributing plenums under the floor, and an above floor housing 14 through which cables, wires and power cords are fed to suitable receptacles within the electrical receptacle 12. The electrical receptacle is preferably fabricated of sheet metal, such as galvanized steel, and comprises a generally closed body 16 featuring an upper surface 18 having a central circular opening 20. About said opening are a plurality of upstanding extensions 22, each containing a threaded pin 24, preferably four in number, about 90° apart. Internally the electrical receptacle includes a base 26 for mounting various receptacles for connecting plural power cords, telephone wires, and co-axial cable connections, as known in the art.

Overriding and for engagement with said electrical receptacle 12 is the above floor housing 14. The above floor housing 14 comprises a generally circular body 28 of a size approximately equal to said central circular opening 20. The body 28 is characterized by an annular wall 30 having a lower edge 32 and an upper edge 34, where the latter edge includes an annular outwardly extending flange 36. In operation, the flange 36 lies contiguous with the floor surface, not shown. To removably connect the respective components, the lower edge 32 includes a plurality of L-shaped slots 38, with a first leg 40 opening to said edge 32, and a laterally extending second leg 42, where the number of slots 38 are equal to and aligned with the location of said threaded pins 24. To engage the components as aligned above, the above floor housing 14 may be lowered onto the electrical receptacle 12 with each said first leg 40 overriding a said respective threaded pin 24, see the direction arrows in FIG. 1, then turned slightly to allow the threaded pin to slide along said second leg 42.

Figure 2:
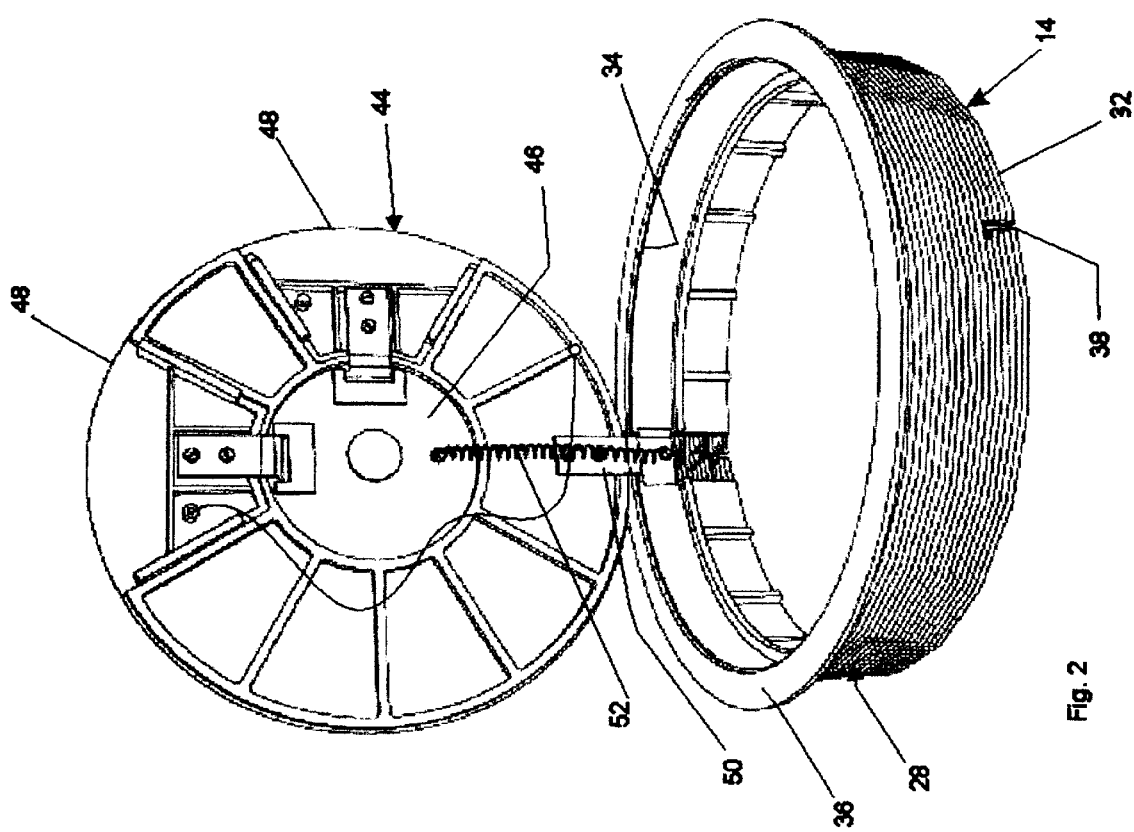
FIG. 2 is a perspective view of the above floor housing showing the hinged cover member in an opened position to reveal details of the underside of the hinged cover member.
Figure 3:
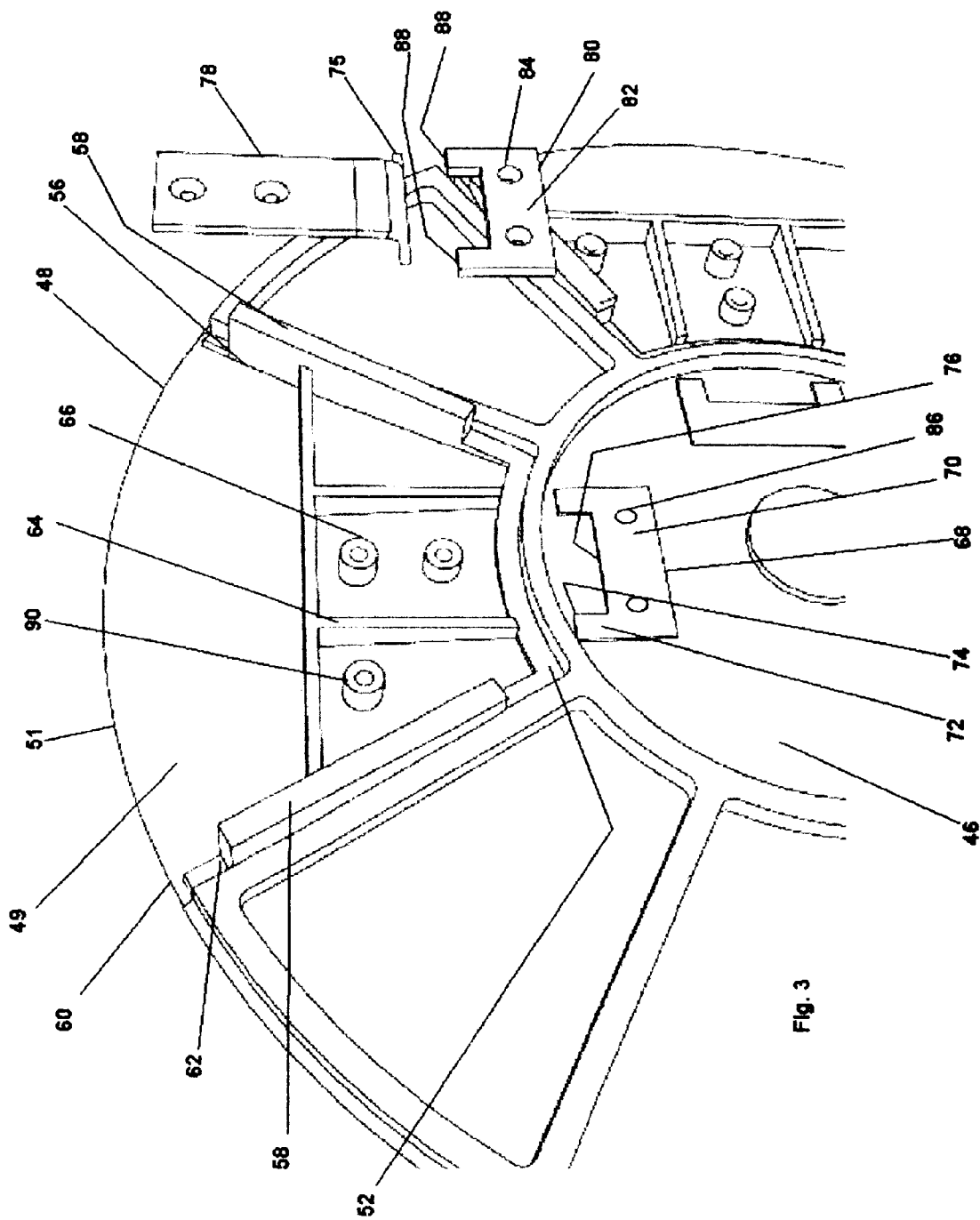
FIG. 3 is a partially exploded perspective view showing further details of the hinge mechanism for the segmented sections of the hinged cover member.

As further illustrated in FIGS. 2 and 3, the above floor housing 14 is further defined by a hinged cover member 44, which may simulate a diffuser top for an under floor air distribution system, having a central portion 46 and plural hinged segments 48, or cable access doors, note FIG. 1. As best seen in FIG. 2, the cover member 44 is hinged by member 50 to the upper edge 34, and includes a tension spring 52 to maintain the cover member in a closed position, until access is required.

FIG. 3 is an exploded view illustrating one hinged segment 48. The hinged segment 48, generally wedge shaped, includes a body portion 49 to lie in a plane with the central portion 46, an outer curved edge 51 to lie in close proximity to said outwardly extending flange 36, a straight inner edge 52 to be hinged to a complementary edge 54 of the central portion 46 of the cover member, and a pair of converging radial edges 56. Each said radial edge features an angled radial support 58, where the outer end 60 includes a stepped portion 62, the function of which will become apparent hereafter. Additionally, the underside of the body portion 49 may include further supports 64, and a pair of upstanding threaded recesses 66 for receiving complementary threaded members, not shown.

The hinge mechanism, preferably comprises three components, two of which are shown expoded from the third component. A first said component is a fixed base member 68, secured, such as by fasteners, to the central portion 46 and aligned at a first portion with said complementary edge 54. The fixed base member 68 comprises a first portion 70 and a second portion 72, where the latter portion includes a pair of inwardly directed opposing arms 74 to define a slot 76 with said first portion. Cooperating with and engaging said slot 76 is a hinge member 78 that is essentially J-shaped with a pair of outwardly directed pins 75 for seating within said slot 76. To maintain a pivotal relationship between the fixed base member 68 and hinge member 78 is a U-shaped holddown member 80. More specifically, the U-shaped holddown member 80 includes a first portion 82 having a pair of apertures 84 for receiving complementary threaded members, as known in the art, for securing said holddown member to the fixed base member 68 via threaded holes 86. The U-shaped holddown member also includes a pair of extending arms 88 which overlie the pins 75 when positioned within the slot 76. Finally, the underside of the hinged segment 48 may include a threaded grounding post 90 to attach a grounding wire thereto, as known in the art.

Figure 4:
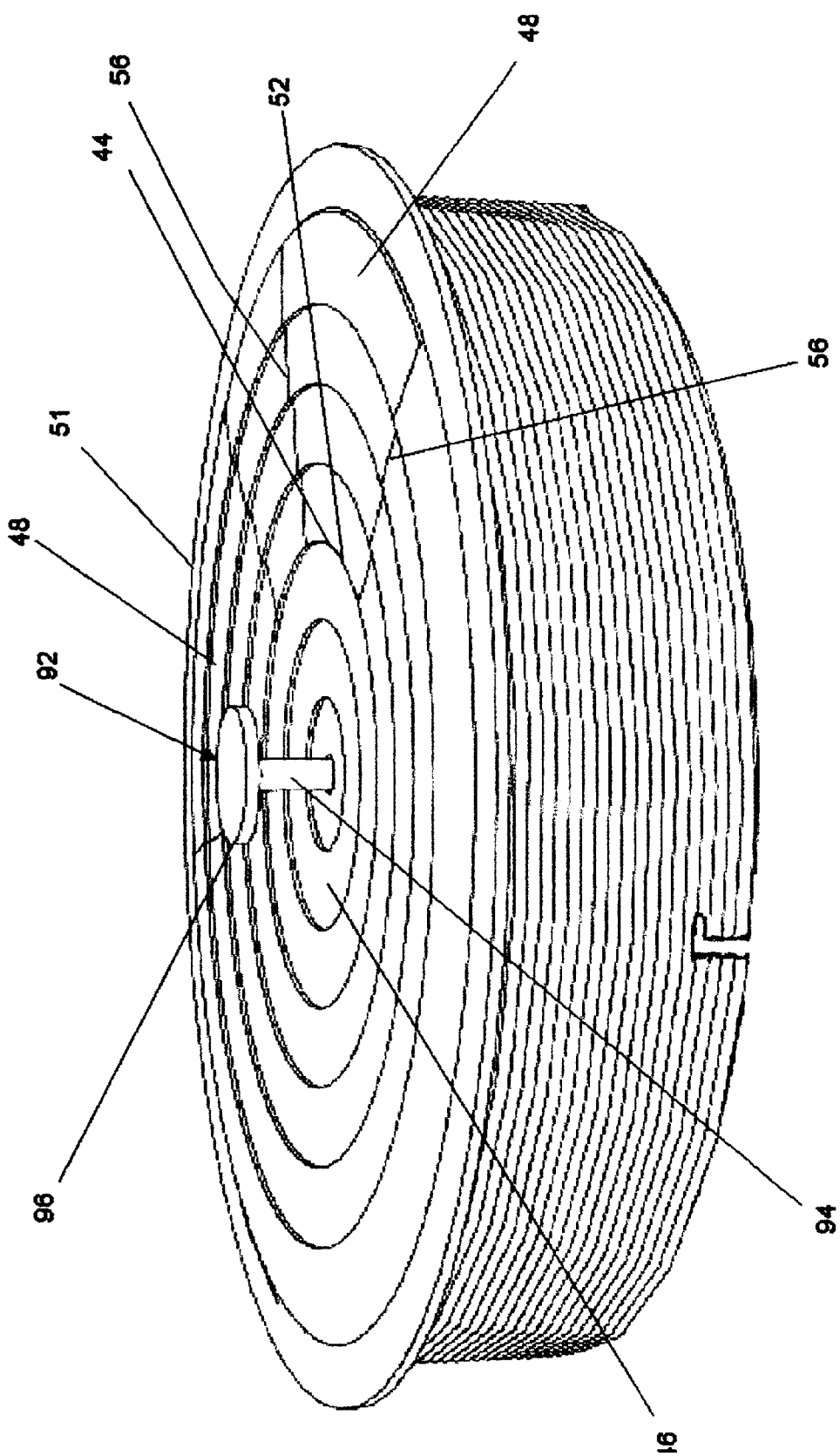
FIG. 4 is a perspective view of the above floor housing showing the depressible, floating handle within a central portion thereof for lifting and latching the above floor housing to a below floor receptacle.

A feature of the present invention is to allow removal and access to the electrical receptacle 12. This may be accomplished by a lifting and/or turning floating handle 92 centrally disposed within the central portion 46, see FIG. 4. The handle may comprise a sliding post 94 terminating in a cap 96 to allow one to grip, lift and/or turn the hinged cover member 44. The handle 92 performs the dual function of lifting and pivoting the cover member, or lifting and turning the above floor housing to separate it from the electrical receptacle.

Figure 5:
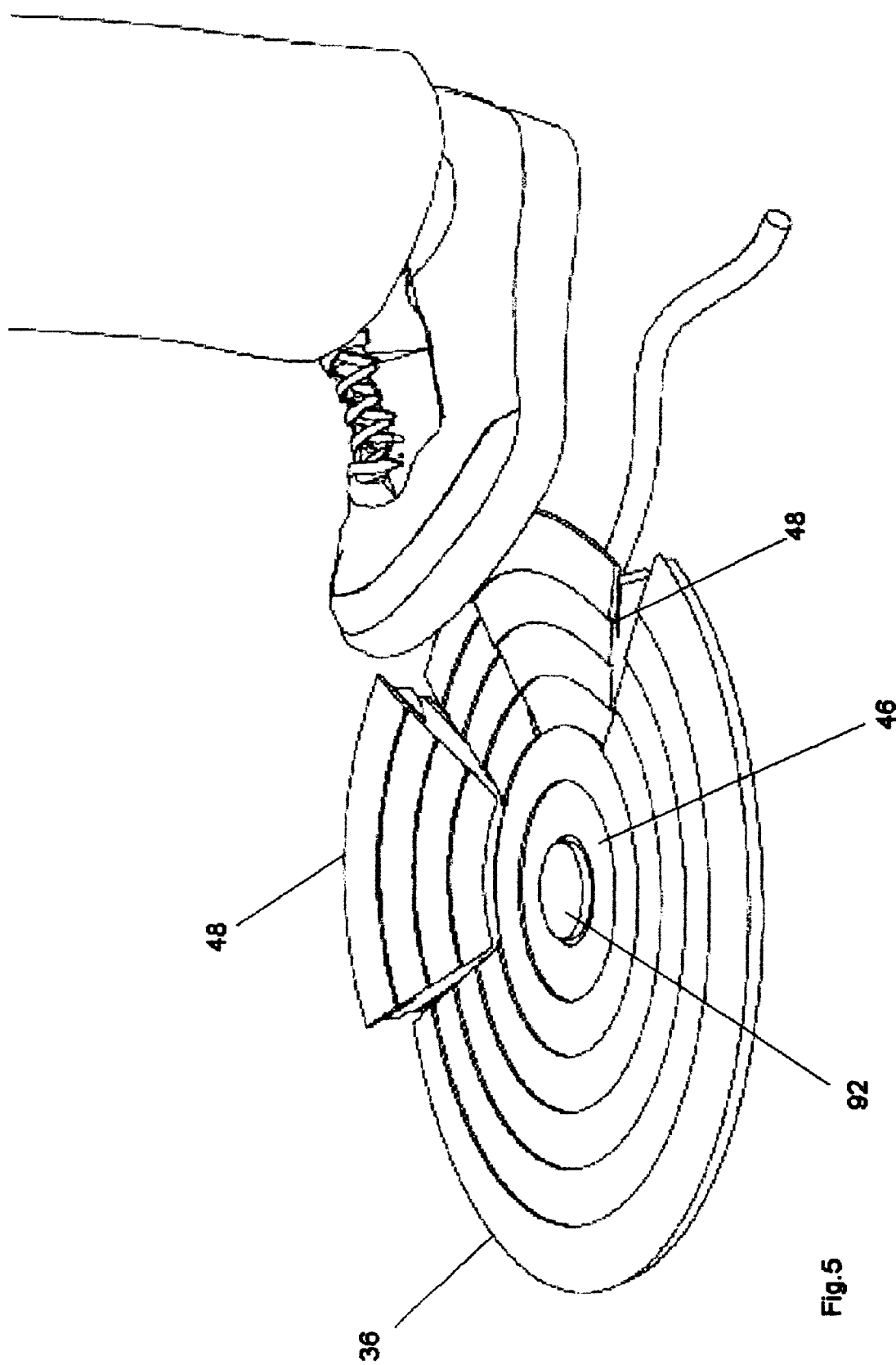
FIG. 5 is perspective view of the floor mounted system of the invention, showing how the wires and cables are protected from inadvertent dislodgment by an office employee.

Since a critical feature of the system hereof is to protect the wires, cables, and power cords from damage or cutting, note FIG. 5, where one may inadvertently step on the respective wires, cables, or power cords, provision is provided for locking the hinged segment 48 in an opened position. It will be recalled that the radial edge supports include a stepped portion 62 for snap engaging the flange 36 at the junction with the annular wall 30, whereby to lock the hinged segment in the open position, as shown in FIG. 5.

It is recognized that changes, variations and modifications may be made to the system of this invention, particularly by those skilled in the art, without departing from the spirit and scope thereof. Accordingly, no limitation is intended to be imposed thereon except as set forth in the accompanying claims.

What is claimed is:

1. In combination with a below floor level cable power and communication link, a floor cable management system to provide electrical and data communication cable connections between selected communication equipment and said below floor cable power and communication link, where each said selected communication equipment includes a cable for connection to a source of electricity or data transmission, said system comprising:
 a.) a below floor electrical receptacle having a top with a circular opening; and,
 b.) an above floor level circular housing for removably mounting within said circular opening, said above floor level circular housing comprising,
  i.) a continuous annular wall terminating at one edge in an annular flange for lying contiguous with said floor,
  ii.) a hinged cover member planarly aligned with said annular flange, said hinged cover member including a central concentric section, where said cover member includes a plurality of segmented access doors radially oriented and rotatably connected to said central concentric section and lockable relative thereto.

2. The floor cable management system according to claim 1, wherein said below floor electrical receptacle includes plural pins extending inwardly from said circular opening, and said opposite edge of said continuous annular wall includes a like plurality of L-shaped slots, with each said slot aligned with a corresponding said pin to effect removable connection of said slots with said pins.

3. The floor cable management system according to claim 2, wherein said central concentric section includes a depressable, flotation handle to turn and raise said hinged cover member.

4. The floor cable management system according to claim 1, wherein said segmented access doors are hinged to said central concentric section.

5. The floor cable management system according to claim 1, wherein said segmented access doors may be locked relative to said annular flange.

6. The floor cable management system according to claim 5, wherein said segmented access doors are wedge shaped and comprise a planar body portion having a lower surface, and a pair of converging edges, where said edges along said lower surface include a support arm, and that support arm features a stepped portion for locking engagement with said annular flange.

7. The floor cable management system according to claim 6, wherein each said segmented access door has an outer curved edge concentric to said annular flange.

8. The floor cable management system according to claim 1, wherein each segmented access door has an inner straight edge for hingedly connecting said access door to said cover member.

* * * * *